United States Patent [19]
Reiss

[11] 3,932,750
[45] Jan. 13, 1976

[54] RAY CONVERTER

[75] Inventor: Karl-Hans Reiss, Erlangen, Germany

[73] Assignee: Siemens Aktiengesellschaft, Munich, Germany

[22] Filed: Jan. 2, 1974

[21] Appl. No.: 430,043

[52] U.S. Cl. ............................. 250/315 A; 250/315
[51] Int. Cl.² .......................................... H01J 31/50
[58] Field of Search ................ 250/315, 326, 315 A

[56] References Cited
UNITED STATES PATENTS

| | | | |
|---|---|---|---|
| 3,603,790 | 9/1971 | Cleare | 250/315 |
| 3,653,890 | 4/1972 | Seimiya et al. | 250/315 |
| 3,710,125 | 1/1973 | Jacobs et al. | 250/315 |
| 3,772,010 | 11/1973 | Weiss | 250/315 |
| 3,803,411 | 4/1974 | Reiss | 250/315 |

FOREIGN PATENTS OR APPLICATIONS

| | | | |
|---|---|---|---|
| 1,963,980 | 6/1969 | Germany | 250/315 |

*Primary Examiner*—James W. Lawrence
*Assistant Examiner*—B. C. Anderson
*Attorney, Agent, or Firm*—V. Alexander Scher

[57] ABSTRACT

In a radiographic system a converter is used for changing image forming intensity distribution in a bundle of penetrating rays into a flow of electrically charged particles by electrodes located in a gas space and partly latticed (grids) which lie at potentials stepped from cathode to anode. The invention is particularly characterized by the provision of at least two grids extending between and parallel to the cathode and the anode. The electrical field which lies between two electrodes lies at least between the grids located closest to the cathode being to the extent of between 1 and 10%, in the average preferably 3% below the electrical break down field in the gas in a homogenous electrical field.

5 Claims, 3 Drawing Figures

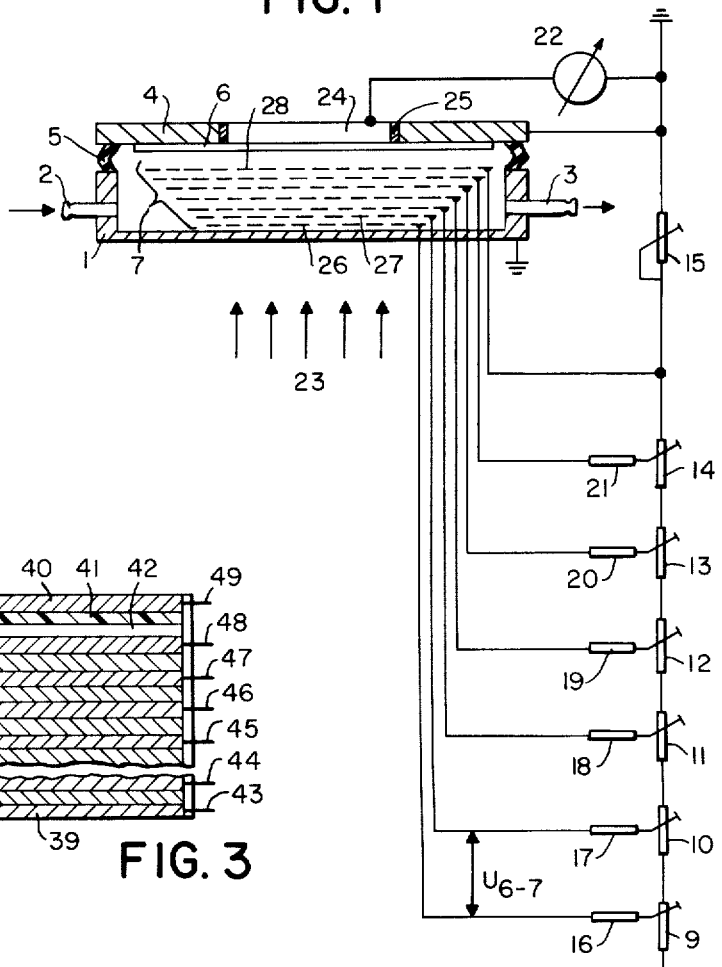
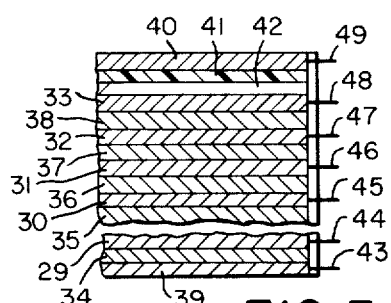
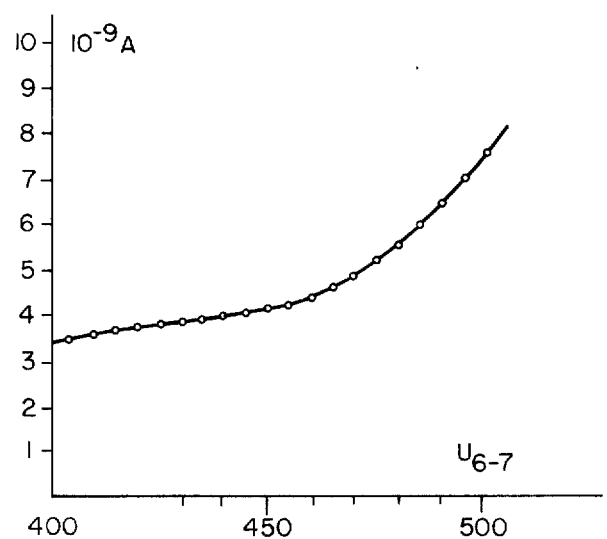
FIG. 1
FIG. 3
FIG. 2

RAY CONVERTER

This invention relates to a converter for changing image forming intensity distribution in the cross-section of a bundle of penetrating rays like X-rays, gamma-rays etc. into an image-divided flow of charged particles.

Such converters are used, for example, for making visible pictures of a distribution of (invisible) penetrating rays, such as X-ray and gamma ray images. This can take place, for example, in devices wherein the current density of charged particles becomes visible by means of alluminous layer. Another use is in devices producing stationary X-ray images, namely, documents. In that case the current of charged particles is collected for a certain time (exposure time) upon a suitable insulating layer and then the collected electric field distribution is made visible by a suitable development process. For example, the layer is introduced in a dark box and exposed to a powder cloud an aerosol etc. like known in electric photography. However, the collected charges of particle currents, for example, can be also converted into video signals to be used in a known manner to produce visible X-ray images.

The usual systems to take X-ray or gamma ray etc. pictures operate practically solely in the roundabout way by luminescence (luminescent screens). The inner photo effect (photoconduction) which would produce electronic signals by itself, is used only rarely. At the present time no mechanism is known to intensify in a plane inner electrons uniformly.

It has been known for some time that images can be produced also by a third effect provided by nature, the outer photo effect (photoemission). It is used in ionography and electrography. There it is possible to intensify in a simple manner with an electrical gas discharge avalanche the number of primary released electrons which are produced image-like by X-rays or gamma rays. For that purpose a suitable gas is subjected to the action of ray distribution in a homogeneous electrical field of suitably high electrical field strength.

In case of the above-mentioned third process, the use of outer photo effect with avalanche amplification, a series of solution suggestions have become known for producing visible images. They refer to make visible the images of charges for documentation (images on paper etc.), as well as images having the form of high speed fluoroscopic images and finally the electronic delivery in the form of a series of impulses, for example, video signals. Up to now, these suggestions could not be carried out for representing radioscopic images etc., as used in X-ray and isotope diagnosis. The extent of efficiency in changing X-ray and gamma quanta into outer photo electrons is very small. For example, in changing diagnostic X-rays in photo electrons when using a heavy metal layer of optimal thickness, the quantum efficiency amounts to only 0.5%. This means that the larger part of information located in the X-ray quanta is lost during the conversion. While losses in charged amounts can be conveniently balanced by amplification by avalanches, the image is very strongly affected by information loss through noise, namely, statistic quantum noise.

An object of the present invention is to provide means constituting a rule by which the quantum efficiency of image changers or converters can be increased for conversion the image forming intensity distribution of X-rays or gamma rays distributed in the cross-section of a ray bundle into electronic information which may be evaluated as images.

Other objects of the present invention will become apparent in the course of the following specification.

In the accomplishment of the objectives of the present invention, the conversion of X-ray or gamma-ray pictures is made by a series of grids or layers of wires with appropriate electric fields between them. It was found desirable to provide at least grids as lattice-shaped parallel electrodes extending between and parallel to the cathode and the anode, whereby the electrical field formed between the electrodes lies at least between the electrode located closest to the cathode below the electrical break-field strength of gas in a homogeneous electrical field to the extent of between 1 and 10%, in the average preferably 3%. As a rule, in an X-ray converter of the present invention, a current of charged particles, the particle density of which corresponds to the distribution of X-ray intensity, is produced by a large number of parallel flat opposed latticetype electrodes which at least partly provide passage for charge carriers in gaseous space, namely, have the shape of, for example, grids, lattice, nets, layers of wires or perforated sheets, etc. of sufficiently fine distribution. The gas space between the individual nets is brought to an electrical field strength the size and token of which are sufficient to multiply the corresponding charge carriers between two nets at least to such an extent that the unavoidable losses by diffusion of charge carriers at the electrodes are at least partly covered. For that purpose, the individual nets, etc. must be only placed at graded potentials which are produced by voltage sources applied from the outside. The field strength between the electrodes must be so great that a weak surge strengthening takes place, this being the case between 1 and 10%, perferably 3% below the break field strength of gas in the homogeneous electrical field.

In another arrangement, when about 10 grids are used, the potential distribution is so selected that the potentials are smaller at the side of the cathode where the rays enter the system than at the electrodes located close to the anode. A larger step of potential is particularly advantageous between the last grid and the grid before last. This produces more freedom for the parallel arrangement of the image surface, because the amplification with avalanches takes place preferably in the space between these two grids, while the space between the anode and the last grid has only saturation field strength.

As suitable gases can be used noble gas in so-called self-quending gas mixtures known for use in ionization chambers, as, for example, mixtures or argon and methane or xenon and methylol. Also carbon dioxide or frigen may be used.

In the devices of the present invention, the surface of the converter is separated into a plurality of thin cathodes, whereby the thickness of the corresponding metal layer is at most the double range of the released electrons (in the range of X-ray energies and depending on the metal used this is from 1 to 10 $\mu$m). The X-ray absorption is increased with the number of grids and the produced electrons can also pass into the gas space, somewhat multiplied, and become effective. Through a sufficiently fine distribution of grids, through a sufficiently close arrangement of the grids and through the use of gas wherein the electrons have a small range, it is possible to keep the image information in comparison with the desired release and the known radiographic arrangements, since the side extension of charge carriers is low.

A coating of the grids with heavy metal, such as gold, improves the output of electrons and increases the scattering of quick electrons. Thus, this procedure can be also used to produce good image release, since then, the average reach width of electrons is diminished. Upon the last net is produced for at least each effectively absorbed X-ray quantum an adjustably increased number of charge carriers. In general, the quantum efficiency is greatly increased by this arrangement in comparison to known devices.

A use of the present invention is hereinafter described in greater detail for a further explanation of its principle. It refers to a foundation study which by no means reaches the limits of the process.

Wire grids of V2A steel with fine meshes and having a mesh width of 56 μm and a wire thickness of 40 μm (cross wiring) were stretched over a number of concentric rings fitting into each other. These rings were electrically insulated from each other by thin pieces of polycarbonate foil and maintained at a distance of 0.20 mm. The usable diameter was that of the innermost ring, in this case, 90 mm. This arrangement of 7 nets of the same type was used as a cathode in an ionization chamber filled with argon having atmospheric pressure. When from 450 v. to 500 v. were applied between the electrodes, it was found that the ionization action in all nets provided an amount to total ionization. By finely varying the voltage between the individual grids, it is possible to operate the total ionization current in the chamber. The quantum output was determined by counting the charging impulses and by counting the incoming X-ray quanta. It was found that even in this simple experimental arrangement, a quantum output of about 5% was produced (as compared to 0.5% in known devices with an optional gold cathode).

The invention will appear more clearly from the following detailed description when taken in connection with the accompanying drawing, showing, by way of example only, preferred embodiments of the inventive idea.

In the drawing:

FIG. 1 is partly a diagrammatic sectional view and partly a circuit diagram of a device wherein the charged particles produced in the converter are collected upon an insulation foil which is then used for xerox development of the latent electric image.

FIG. 2 is a diagram showing the control effect produced by changing the applied voltage.

FIG. 3 is a diagrammatic sectional view of an X-ray photographing device with a converter in accordance with the present invention.

The chamber of the construction shown in FIG. 1 consists of an aluminum casing 1 having a gas inflow 2 and a gas outflow 3. The casing is closed by a cover 4 through a seal 5 to build a dark box. The individual nets 7 which are shown diagrammatically all extend over voltage dividers 9 to 15 (each 500 k$\Omega$) and protective resistances 16 to 21 (each 10 M$\Omega$) at the direct voltage source 8. The measuring instrument 21 shows ionization currents and impulse sequences which are produced when the X-ray flow 23 is switched on. To avoid edge effects, the cover 4 is provided with an insert 24 which is isolatedly fixed to the cover 4 by a ring 25 of polytetrafluorethylene.

The experimental program which can be measured with this device is stated herein in a small extract which shows the functioning of the device.

FIG. 2 is a diagram showing the ionization current measured by the instrument 22 depending upon the voltage between the sixth and the seventh net, i.e., between the nets 26 and 27 ($U_{6-7}$), consequently the voltage between the voltage dividers 9 and 10. The ionization chamber is filled with pure argon. The X-rays amounted to 15 mR/sec. They were the so-called ICRU ray emission, i.e., X-rays of 7 mm Al half value layer. The curve of FIG. 2 shows that above a certain voltage, in this case 450 v., starts an avalanche amplification in the gas gap between the nets 26 and 27, and that the currents there produced evidently work through the other six nets into the space between the uppermost net 28 and the measuring electrode 24.

The illustrated construction additionally may be tested by the insulating layer 6 shown in FIG. 1. When this insulating layer is inserted into the ionization chamber, a continuous current measurement is not possible any more. However, it is possible to catch charges upon such an insulating layer, consisting, for example, of a polycarbonate foil which is 200 μm thick. The charges can be made visible with known electrophotographic processes (powder, aerosol dust, etc. development). In that case, it is also possible to investigate the image-wise distribution of X-rays 23.

A further embodiment of the present invention is a large picture photographing system, a so-called full-size radiographic device shown diagrammatically in section in FIG. 3. The device uses very many finely wired nets 29 to 33 in the normal X-ray image size of 30 × 40 cm$^2$ which are held at a distance from each other not only at the edges but also through the entire surfaces with thin wired insulating nets 34 to 38 with fine meshes of polytetrafluorethylene. The metallic nets 29 to 33 consist of V2A and have a mesh width of 25 μm (so-called 540 mesh nets). The distance holding nets 34 to 38 consist of a cross-wiring with individual threads having a thickness of 10 μm in a mesh spacing of 25 μm. Between the nets 29 to 33 lie through connections 43 to 49 voltages of 200 to 250 v. In addition to the arrangement 20 between the nets 26 to 32 shown by broken lines, such nets are placed in layers one over the other and held at the edge by gluing with epoxyde resin. The gas filling of this chamber consists of argon with an addition of 10% methylol. Prior to their insertion, the nets can be improved by a layer of gold deposited by vacuum evaporation onto the surface of the nets so as to produce a still greater X-ray quantum efficiency. This arrangement produces a resolution of about 8 Per/mm for diagnostically used X-rays dropping from a focal distance of 100 cm. The quantum efficiency amounts to about 12% as compared to known devices wherein it amounted to 0.5%. The total absorption of these nets for X-rays amounts to 45%. By comparison, a better quantum efficiency could not be attained in the usual combination of X-ray film and intensification foil.

Further combinations of a fast imaging device or a nuclear medical gamma camera differ from the illustrated and described devices solely in the reproduction section connected to the converter of the present invention for producing a charging image of penetrating rays. For that purpose, the insulating layer 6 can be replaced by the target of a television pickup tube for producing video signals. The dimensions and constructive shapes can be modified to adapt them to the desired uses.

In applying the above-indicated principle, the devices were subjected to voltages of 180 to 300 v. By selecting the voltage dividers, they were so applied that, between the inlet electrode 39 and the first net 29, there was a voltage of 180 v., to the second net 185 v. and continuously 190 v. moved up to the net 32 before last. The remaining 300 v. then produce in the space 38 before the net 33a an avalanche intensifying by the factor 30 to 150. In the space 42, there is an electric field in the saturation range. This produces the advantages already described in the specification. The insulating layer 41 to collect the charged particles is attached inside the cover 40 like the insulating layer 4 of FIG. 1.

I claim:

1. A converter device for producing a stream of electrically-charged particles in which the particle distribution over the cross-section of the stream varies in dependence upon the intensity distribution over the cross-section of a beam of penetrating radiation directed on to the device, the device comprising an anode, a cathode, an ionization chamber having a plurality of gridform electrodes arranged one after another along a path from the anode to the cathode, said gridform electrodes being substantially parallel to the anode and the cathode, and means connected with the grid-form electrodes for applying thereto working voltages, which increase in the direction from the cathode to the anode, whereby when the device is in use with gas in the chamber under given working conditions there is produced between two of the gridform electrodes which are adjacent to the cathode an electric field having a strength between 1% and 10% below the minimum strength of a homogeneous electric field that would be required to bring about electrical break-down in said gas under the given working conditions.

2. A converter in accordance with claim 1, wherein said field is 3% below the break-down field.

3. A converter in accordance with claim 1, wherein said cathode consists of aluminum foil, the converter having ten grids extending in a row at a distance of 0.25 mm. from each other, the first of said grids extending at a distance of 0.25 mm. from the cathode, the last of said grids extending at a distance of 1 mm. from the anode, an electrically insulating foil upon said anode, the gas consisting of a filling of argon-methane, said electrical field having voltages between the cathode and the first grid and between individual grids amounting to 450–5000 v. and between the last grid closest to the anode and the grid before last amounting to 650 v.

4. A converter in accordance with claim 3, wherein the grids have a coating of heavy metal.

5. A converter in accordance with claim 3, having insulating nets extending between the first-mentioned grids.

* * * * *